(12) United States Patent
Huscher et al.

(10) Patent No.: US 8,358,206 A0
(45) Date of Patent: Jan. 22, 2013

(54) DEVICE FOR ACQUIRING SIGNALS FROM SENSORS INSTALLED IN A MOTOR VEHICLE

(75) Inventors: Rainer Huscher, Waldorshof (DE); Udo Mayer, Weiden (DE); Frank Schröer, Weiden (DE)

(73) Assignee: NEXANS (FR)

( * ) Notice: Subject to any disclaimer, the term of this patent is extended or adjusted under 35 U.S.C. 154(b) by 562 days.

(21) Appl. No.: 10/869,481

(22) Filed: Jun. 15, 2004

(65) Prior Publication Data

US 2005/0242666 A1   Nov. 3, 2005

(30) Foreign Application Priority Data

Sep. 25, 2003   (DE) .................................. 103 44 464

(51) Int. Cl.
*B60Q 1/00* (2006.01)
(52) U.S. Cl. ............................. 340/449; 340/438; 439/34
(58) Field of Classification Search .................. 340/449, 340/426.25, 436, 438; 439/34
See application file for complete search history.

(56) References Cited

U.S. PATENT DOCUMENTS 6,867,695 B2 * 3/2005 Prado et al. ................ 340/568.1
7,059,769 B1 * 6/2006 Potega ........................... 374/185

FOREIGN PATENT DOCUMENTS

| DE | 4436829 | 8/1996 | ............................ 9/7 |
| DE | 19835782 | 4/1999 | |
| DE | 10308663 | 12/2003 | ........................ 7/38 |
| GB | 2300980 A | * 11/1996 | |

OTHER PUBLICATIONS

German search report dated Oct. 8, 2003.

* cited by examiner

*Primary Examiner* — Phung T. Nguyen
(74) *Attorney, Agent, or Firm* — Sofer & Haroun, LLP

(57) ABSTRACT

The invention pertains to a device for acquiring signals from sensors (1) installed in a motor vehicle, where at least two sensors, which are connected by electrical conductors to a source of electrical voltage (2) and to an evaluation unit (3), are mounted in different positions in the vehicle. To simplify the installation of the device, the sensors (1) are attached a certain distance apart to a common ribbon cable (4) with parallel electrical conductors, which cable has at least one conductor which can be connected to the voltage source (2) to supply power to the sensors (1) and several signal conductors, which can be connected to the evaluation unit (3) and possibly also to the voltage source (2), the number of which corresponds to the number of sensors to be connected. All of the sensors (1) are connected to the power-supply conductor, and each one is connected individually to one of the signal conductors.

10 Claims, 3 Drawing Sheets

DEVICE FOR ACQUIRING SIGNALS FROM SENSORS INSTALLED IN A MOTOR VEHICLE

RELATED APPLICATION

This application is related to and claims the benefit of priority from German Patent Application No. 103 44 464.5, filed on Sep. 25, 2003, the entirety of which is incorporated herein by reference.

FIELD OF THE INVENTION

The invention pertains to a device for acquiring signals from sensors installed in a motor vehicle, where at least two sensors, which are connected by electrical conductors to a source of electrical voltage and to an evaluation unit, are mounted in different positions in the vehicle.

BACKGROUND

A device of this type can be mounted in different areas of a motor vehicle and can also serve different purposes. For example, temperature sensors, which are installed at various points in the interior of the vehicle, can be used to control the vehicle's climate-control system. The sensors could also be of the distance-measuring type, which are installed in the area of the vehicle's bumpers. This particular application of the device will be considered in the following as a representative of all the other possible applications of such devices, but the invention is not to be considered restricted to this application.

A system for warning the vehicle's operator against an obstacle is referred to in engineering jargon as "park distance control". It is used especially during the parking process and makes use of optical and/or acoustic signals to tell the operator how far the vehicle is from an obstacle. The vehicle driver can then stop his vehicle in time so that a collision with the obstacle is avoided.

Similar devices are already present in modern motor vehicles. The sensors used as distance-measuring devices are usually positioned in the vehicles' bumpers. Each sensor is connected by electrical conductors to the voltage source (the battery) of the vehicle and by a signal conductor to the vehicle's signaling device. The corresponding conductors are usually combined into so-called cable harnesses. The larger the number of sensors, the thicker the cable harness and the greater the complexity of the work required to install the sensors.

OBJECTS AND SUMMARY

The invention is based on the task of simplifying the device described above with respect to its design and handling.

This task is accomplished according to the invention in that:
- the sensors are connected to each other a certain distance apart on a common ribbon cable with parallel electrical conductors, which cable has:
- at least one conductor which can be connected to the voltage source to supply power to the sensors and
- several signal conductors, which can be connected to the evaluation unit and possibly also to the voltage source, the number of which corresponds to the number of sensors to be connected; and in that
- all of the sensors are connected to the power-supply conductor, and each one is connected individually to one of the signal conductors.

A ribbon cable of predetermined length can be equipped with the desired number sensors for this device right in the factory. In this completely prefabricated form, it can be installed in the area of, for example, the bumper of the motor vehicle or in the bumper itself and connected electrically to the voltage source and to the evaluation unit of the motor vehicle. An appropriate connecting cable can also be connected to the ribbon cable right in the factory. After the installation of this device, the sensors are already in their intended positions in the motor vehicle. To connect it to the voltage source and to the evaluation unit, only a single connecting cable is required per device, the number of conductors in the connecting cable corresponding to number of the conductors in the ribbon cable. The device is easy to install, because in each case only one prefabricated component must be installed in the vehicle and fastened in place. It is simple in its overall design and has only a few individual parts.

In a preferred embodiment, the sensors are not connected directly to the ribbon cable but rather by way of plug-and-socket connectors. For this purpose, plug elements with contacts can be attached in a waterproof manner to the points along the length of the ribbon cable where the sensors are to be connected; the sensors, which are equipped with appropriately designed mating contacts, can then be set onto the plug elements. It is advantageous for this to be done during or after the installation of the ribbon cable in the vehicle.

It is especially advantageous for the plug elements installed on the ribbon cable to be of identical design for all the sensors and for these plug elements to have the same number of contact blades as there are conductors in the ribbon cable. In each plug element, only one of the several contact blades provided for the signal conductors will actually be in effective contact with one of the signal conductors.

BRIEF DESCRIPTION OF THE DRAWINGS

Exemplary embodiments of the object of the invention are illustrated in the drawings.

DETAILED DESCRIPTION

Figure 1:
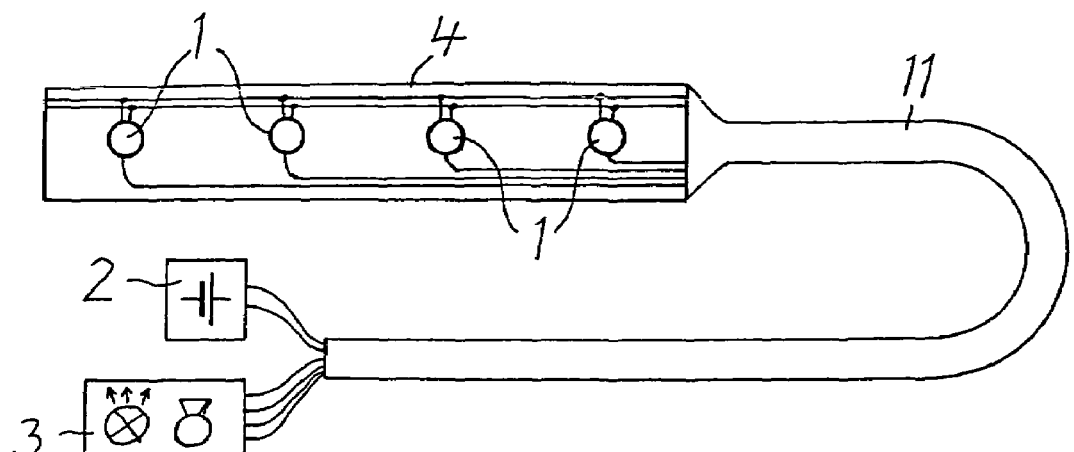
FIG. 1 shows a schematic diagram of a device with sensors according to the invention.

In the exemplary embodiment illustrated in FIG. 1, four sensors 1 are present in a device according to the invention. The device can also be equipped with more or fewer than four sensors 1. It should have at least two sensors 1. The sensors 1 are connected to an electrical voltage source 2, which supplies them with power, and also to an evaluation unit 3, referred to in the following as the "signaling unit 3", both of which are installed in a vehicle, also referred to as a "car" or "passenger car" in the following. The voltage source 2 will usually be the car battery. When the car approaches an obstacle, the signaling unit 3 transmits optical and/or acoustic warning signals, so that the driver can stop his car in time.

This is advantageous especially when the driver is parking the car in an empty parking space. Sensors 1 will therefore always be installed at the rear of the vehicle, preferably on the bumper present there.

Figure 2:
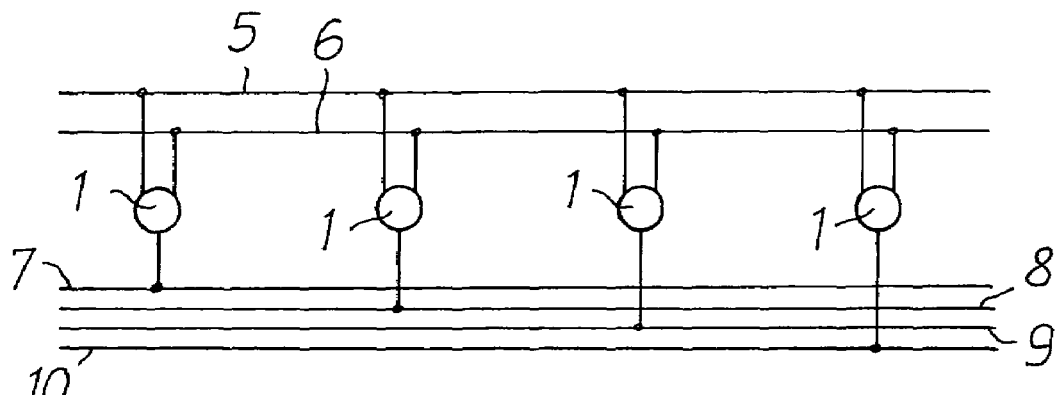
FIG. 2 shows a magnified view, also in the form of a schematic diagram, of the arrangement of the sensors according to FIG. 1.

In the device according to the invention, the sensors 1 are connected to the electrical conductors of a ribbon cable 4, as shown in FIGS. 1 and 2. The ribbon cable 4, referred to in the following as "RC 4", is preferably designed as a ribbon cable in which flat conductors with a rectangular cross section are embedded in insulating material parallel to each other but a certain distance apart. The conductors can for this purpose be laminated between two sheets of insulating material. The insulating material could also be extruded around the conductors, however. A cable of this type takes of up little space and is also quite flexible.

In the exemplary embodiment illustrated here, RC 4 has six electrical conductors 5-10. The conductors 5 and 6 serve to supply power to the sensors 1, all of which are connected to these two conductors. The other four conductors are signal conductors 7, 8, 9, and 10 for transmitting the signals (data) supplied by the sensors 1 to the signaling unit 3. For this purpose, as shown in FIG. 2, each sensor 1 is connected to one of the signal conductors 7-10, so that the data from an individual sensor 1 are transmitted to the signaling unit 3 separately from the data of the other sensors.

A connecting cable 11 is connected to RC 4. In the present exemplary embodiment, this cable, like RC 4, has six conductors and serves to connect the sensors 1 to the voltage source 2 and to the signaling unit 3.

Figure 3:
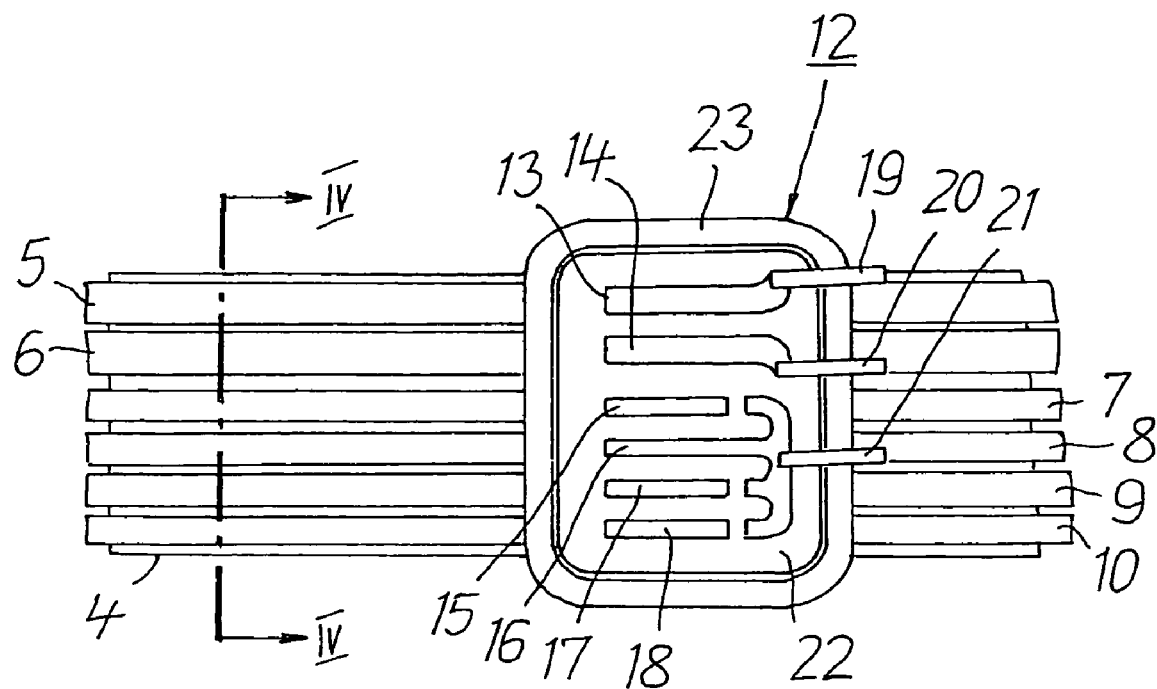
FIG. 3 shows a part of the device according to FIG. 1 on an even larger scale.

In a preferred embodiment, a plug element 12 is attached as a first step in a waterproof manner to the RC 4 at every point where a sensor 1 is to be connected. As shown in FIG. 3, the plug element 12 has six contact blades 13, 14, 15, 16, 17, and 18. It also has three pins 19, 20, and 21, upon which a sensor 1 equipped with appropriately designed mating contacts can be set. It is especially advantageous for all of the connection points to be equipped with plug elements 12 of identical design. The contact blades and pins are mounted in a common holder 22 of stable insulating material, which is itself mounted in a frame 23, which surrounds the RC 4 in a waterproof manner.

By way of example, the following procedure can be used to install a plug element 12 according to FIG. 3 and to establish the electrical connection between its contact blades 13-18 and the conductors 5-10 of the RC 4:

At a connection point provided for a plug element 12, a strip of insulation of predetermined width extending across RC 4 is removed from the RC 4 above the conductors 5-10 on at least one side. The frame 23 of the plug element 12, consisting preferably of sealing material, is then attached to the RC 4 in such a way that the uninsulated part of the strip remains exposed. Then, the holder 22 is set into the frame 23 in such a way that the ends of the contact blades 13-18 rest against the now bare parts of the associated conductors 5-10 of the RC 4. Previously, three of the contact blades 15-18 have been interrupted or disconnected by means of a stamping operation, for example, because the pin 21 serving to connect the sensor 1 to the signaling unit 3 is originally connected to all four contact blades 15-18, which are also connected to each other. Per connection point, three of the contact blades 15-18 are therefore interrupted. According to FIG. 3, this interruption applies to the contact blades 15, 17, and 18. Contact blade 16 is not interrupted, which means that the pin 21 is connected via the contact blade 16 and the signal conductor 8 to the signaling unit 3.

All of the contact blades 13-18 are then connected electrically to their intended conductors of the RC 4, preferably by welding or soldering. This is done preferably in a uniform manner in a single procedure for each connection point. As a result, according to FIG. 3, the contact blades 13 and 14, which are separate from each other, are connected to the power-supply conductors 5 and 6, and simultaneously the contact blade 16 is connected to the conductor 8 of the RC 4. This also applies to the pins 19 and 20, which are attached to the contact blades 13 and 14, and to the pin 21, which is connected to the contact blade 16. By means of an injection-molding process, for example, the plug element 12 can then be embedded in a waterproof manner in a protective body 24 of insulating material in such a way that the free ends of the pins 19, 20, and 21 are left exposed. A sensor 1 can be set down onto the pins 19, 20, and 21, which are projecting out from the protective body. The connection point in question, however, can also be covered in a waterproof manner by, for example, a cover attached to the frame 23.

Figures 9, 10:
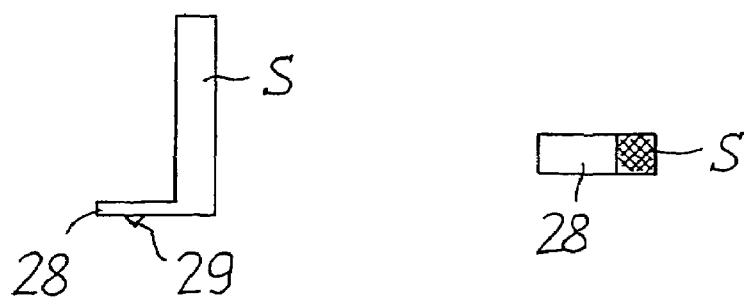
FIGS. 9 and 10 show two different views of a pin which can be used in the device.

An embodiment of the device different from that of FIG. 3 with differently designed connection points for the sensors 1 can be seen in FIGS. 5-8. Here, three pins 25, 26, and 27 of identical design are used per connection point. As illustrated in FIGS. 9 and 10, they have the form of an "L" with a shorter sidepiece 28 and a longer sidepiece S, which serves as the actual pin. This pin part is crosshatched in FIG. 10 and in FIGS. 5-8. A piercing element 29 (illustrated only in schematic fashion) is provided on the bottom surface of the shorter sidepiece 28 of the pin to make contact with a conductor of the RC 4. The pins 25, 26, and 27 are thus each electrically connected to one of the conductors 5-10 of the RC 4, whereas the ends of their longer sidepieces S, which project vertically from the RC 4, serve to accept the sensors 1. The ends of the pins 25, 26, and 27, which are equal distances apart, preferably form the vertices of a triangle at each connection point. The shorter sidepieces 28 of the pins 25, 26, and 27 should not be wider than the conductors of the RC 4 onto which they are placed and with which they establish electrical contact.

In the embodiment of the device according to FIGS. 5-8, the power-supply conductors 5 and 6 of the RC 4 are in the middle of the RC 4. Two of the signal conductors 7-10 are on one side of the conductors 5 and 6, and the two others are on the other side. The three pins 25, 26, 27 are arranged differently at each of the four connection points, because different signal conductors must be contacted. To establish the electrical connections with the conductors 5-10 of the RC 4, the piercing elements 29, as already mentioned, are preferably provided on the short sidepieces 28 of the L-shaped pins 25, 26, and 27; the piercing element 29 pierces the insulation of the RC 4 and the associated conductor and is thus connected permanently to it. The pins and conductors, however, can also be connected to each other by welding or soldering, after the conductors have first been freed of their insulation at the appropriate points. So that all four signal conductors 7-10 can be contacted without changing the triangular arrangement of the pins 25, 26, 27, the sidepieces 28 of the pins to be connected to the signal conductors at the various connection points need only to be rotated 90°. This applies to the two signal conductors 7 and 8 on one side and also to the signal conductors 9 and 10 on the other.

Figure 5:
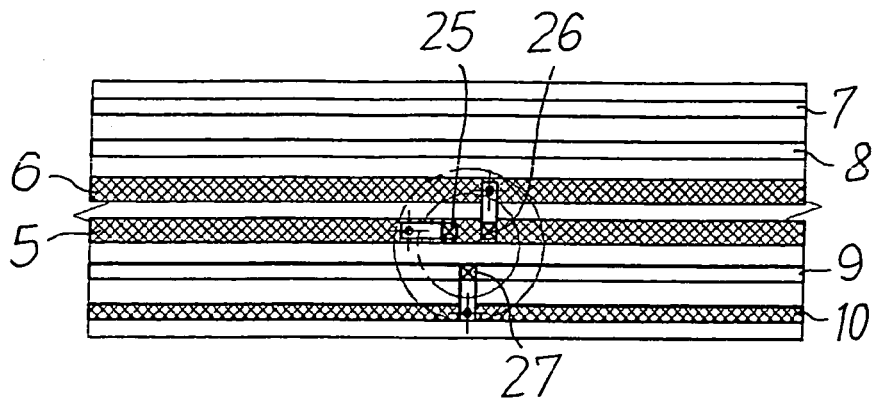
FIGS. 5-8 show parts of the device according to FIG. 1 in embodiments different from that shown in FIG. 3, also on an enlarged scale.

At the connection point for a sensor 1 according to FIG. 5, the pin 25 is connected to the conductor 5 of the RC 4 which serves to supply power. Its short sidepiece extends in the direction of the conductor 5. The short sidepiece of pin 26, however, is at a right angle to the conductor 6, to which it is to be connected. This also applies to the pin 27, which is connected to the signal conductor 10. The connection points between the short sidepieces 28 of the pins and the conductors of the RC 4 are indicated by "X's" in FIGS. 5-8.

Figure 6:
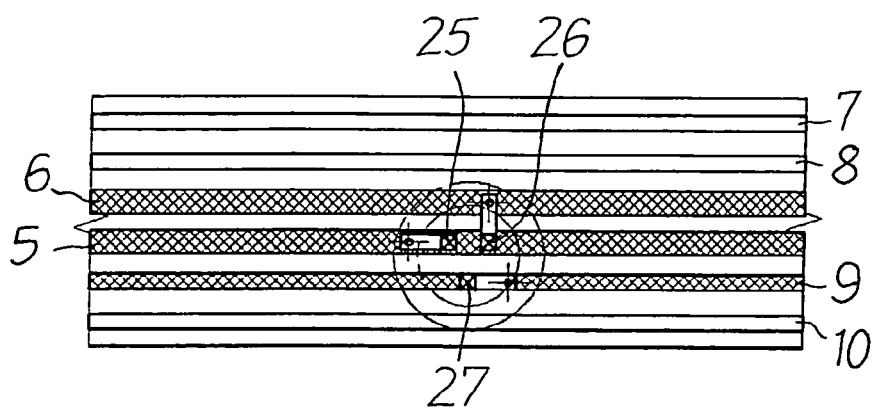

At the connection point shown in FIG. 6, the positions of the pins 25 and 26 are the same as those shown in FIG. 5. To connect a sensor 1 to the signal conductor 9, however, the pin 27 has been rotated 90° from the position shown in FIG. 5. The short sidepiece of the pin 27 now extends in the direction of the signal conductor 9, to which it is electrically connected.

Figure 7:
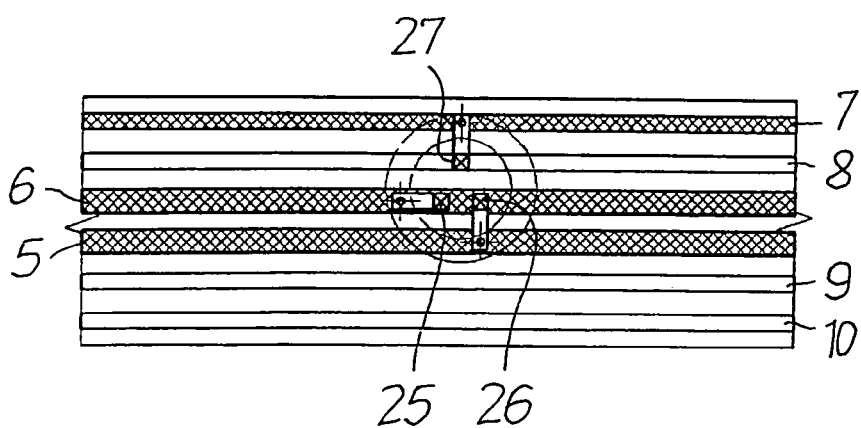
Figure 8:
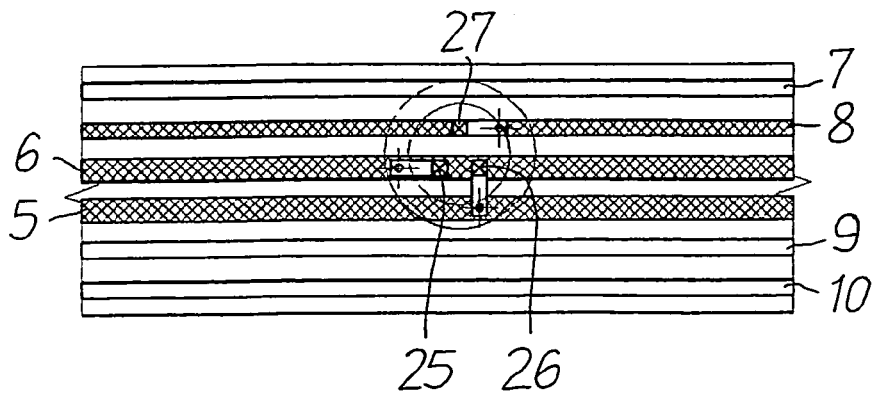

FIGS. 7 and 8 show similar combinations of power-supply conductors 5 and 6 and signal conductors, except that here it is signal conductors 7 and 8 which are to be contacted. The two pins 25 and 26 are rotated in comparison with their positions in the connection points shown in FIGS. 5 and 6. In the present combinations with the signal conductors 7 and 8, however, they are still connected to the conductors 5 and 6 of the RC 4 serving to supply power. The pin 25 is now connected to the power-supply conductor 6 with its shorter sidepiece extending in the direction of the conductor 6. The shorter sidepiece of the pin 26 is now at a right angle to the conductor 5, to which it is electrically connected. In the first of the two connection points in which the signal conductors 7 and 8 on the other side of the RC4 are to be contacted, as shown in FIG. 7, the pin 27 establishes contact with the signal conductor 7 with its short sidepiece forming a right angle with the conductor 7. For the fourth connection point according to FIG. 8, the pin 27 is rotated 90° versus FIG. 7. Its short sidepiece here extends in the direction of conductor 8, to which it is connected.

Figure 4:
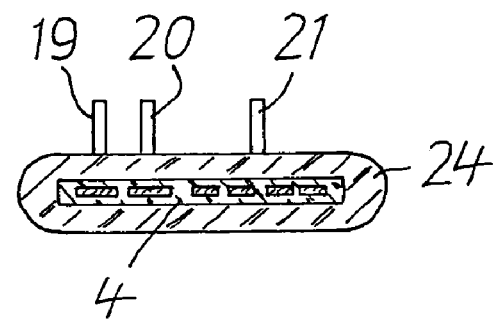
FIG. 4 shows a cross section through FIG. 3 in the direction of line IV-IV.

To stabilize them, if desired, the pins 25, 26, 27 at all of the connection points can also be embedded by injection molding in a waterproof protective body so that their free ends are left exposed, as described further above in association with the embodiment of the device according to FIGS. 3 and 4. The sensors 1 can then be set onto the pins 25, 26, 27 projecting from the protective body. In this embodiment, too, there is also the alternative of sealing off the connection points by means of a waterproof cover.

The device according to the invention has been described above on the basis of its use in a park control system for passenger cars. When the device is to be used, for example, as part of temperature detection unit in the climate-control system of a passenger car, the sensors can be designed as temperature-dependent electrical resistors, for example, to detect the temperature. The RC 4 then requires only one power-supplying "go" conductor, which is connected to the voltage source and to which all of the temperature sensors are connected. The conductors referred to above as signal conductors are used as the power return lines, to each of which one of the temperature sensors is connected independently of the others. The temperature-dependent resistance value to be evaluated as the signal in this application is thus easily transmitted and evaluated.

The invention claimed is:

1. Device for detecting signals from sensors installed in a motor vehicle comprising:
    at least two sensors installed at separate positions in the vehicle and connected by electrical conductors to an electric voltage source and to an evaluation unit, wherein:
    the sensors are connected at distance apart from one another to a common ribbon cable with parallel electrical conductors, at least one which conductors can be connected to the voltage source to supply the sensors with power, and with several signal conductors, the number of which corresponds to the number of sensors to be connected and which can be connected to the evaluation unit and the voltage source; and in that
    all of the sensors are connected to the power-supply conductor, and each one is also connected individually to one of the signal conductors by use of substantially identical connecting elements onto which the sensors can be set and which are provided at each point where the sensors are to be connected.

2. Device according to claim 1, wherein the ribbon cable has two conductors for supplying power to the sensors and several signal-transmitting conductors, the number of which corresponds to the number of sensors to be connected.

3. Device according to claim 1, said substantially identical connecting elements are substantially identical plug elements, which are connected to the conductors of the ribbon cable and onto which the sensors can be set, are mounted at each of the points where the sensors are to be connected.

4. Device according to claim 3, wherein in that the plug elements have contact blades for establishing electrical contact with the conductors of the ribbon cable, the number of blades corresponding to the number of conductors.

5. Device according to claim 1, wherein identical L-shaped pins, onto which the sensors can be set, are provided at each point where the sensors are to be connected, the pins of each set being connected to the two conductors which supply power to the sensors but to only one of the signal conductors of the ribbon cable, to the signal conductor assigned to the sensor in question.

6. Device according to claim 5, wherein, at each of the connection points, the pins are arranged at equal distances from each other in the form of a triangle, the vertices of which they form.

7. Device according to claim 1, wherein the ribbon cable is designed as a flat conductor ribbon cable.

8. Device according to claim 1, wherein the ribbon cable has a common go conductor to supply power to all the sensors and also several conductors serving as return lines, which serve simultaneously as signal conductors, the number of signal conductors being the same as the number of sensors to be connected, where each sensor is connected to one of the return lines.

9. Use of a device according to claim 1 for a park control system, in which the sensors are installed in the area of at least one of the vehicle's bumpers, at the rear or at the front of the vehicle.

10. Use of a device according to claim 1 for a temperature detection unit in the climate-control system of a vehicle, in which the sensors, which are designed as temperature sensors, are installed in the interior of the vehicle.

* * * * *

UNITED STATES PATENT AND TRADEMARK OFFICE
CERTIFICATE OF CORRECTION

PATENT NO. : 8,358,206 B2
APPLICATION NO. : 10/869481
DATED : January 22, 2013
INVENTOR(S) : Rainer Huscher et al.

It is certified that error appears in the above-identified patent and that said Letters Patent is hereby corrected as shown below:

In the Claims

Column 5, Line 52, Claim 1 Line 1 - the word "a" is missing

Signed and Sealed this
Eleventh Day of June, 2013

Teresa Stanek Rea
*Acting Director of the United States Patent and Trademark Office*